Sept. 26, 1961          E. R. ANDERSON          3,001,562
APPARATUS FOR PEELING FRUIT AND VEGETABLE ARTICLES
Original Filed Nov. 13, 1953          2 Sheets-Sheet 2
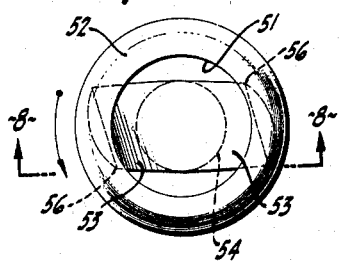
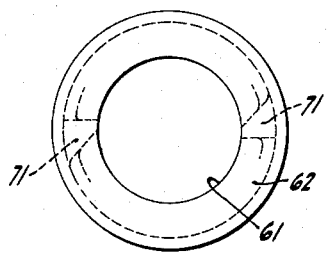
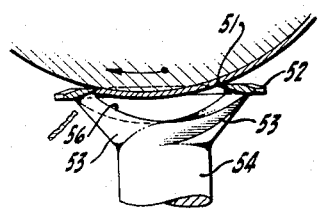
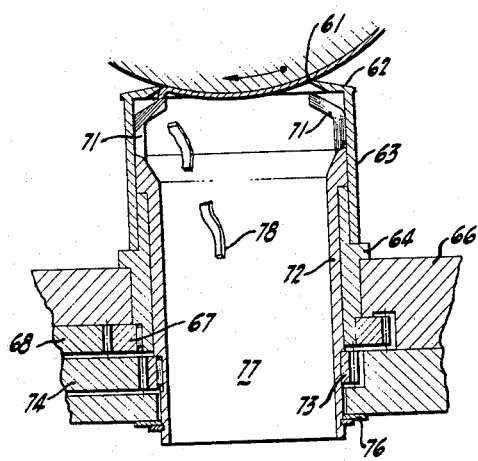
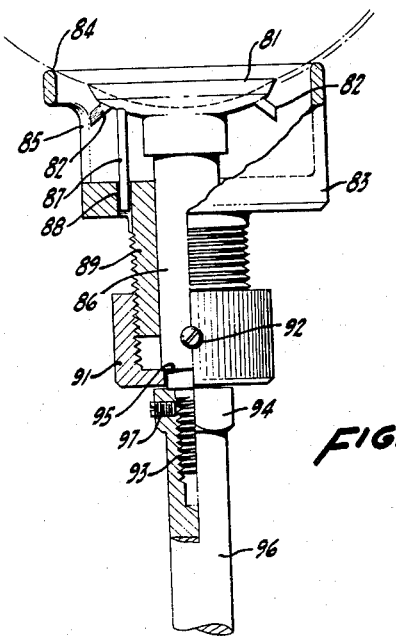
INVENTOR.
EARL R. ANDERSON
BY
Allen and Chromy
his ATTORNEYS

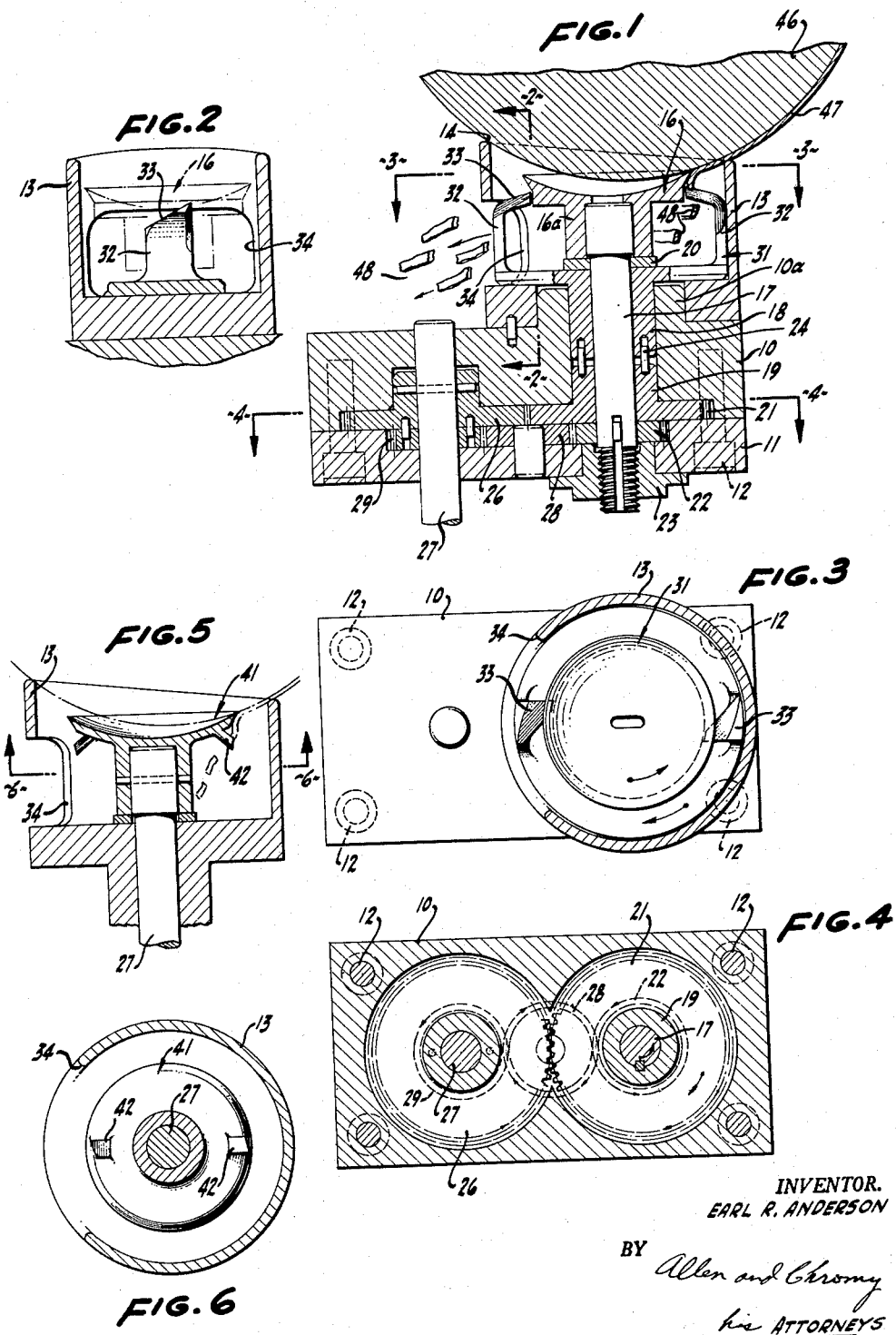

United States Patent Office 3,001,562
Patented Sept. 26, 1961

3,001,562
APPARATUS FOR PEELING FRUIT AND VEGETABLE ARTICLES
Earl R. Anderson, Quito and Pollard Road, Campbell, Calif.
Original application Nov. 13, 1953, Ser. No. 391,879. Divided and this application Nov. 15, 1956, Ser. No. 622,403
2 Claims. (Cl. 146—43)

The present invention relates to the peeling of fruit and vegetable articles and is concerned more particularly with the provision of improved apparatus for removing the peel from a fruit article, for example, in a continuous fashion and simultaneously severing the peel into small pieces.

This application is a division of my co-pending application No. 391,879 filed November 13, 1953, now abandoned.

It is a general object of the invention to provide an improved apparatus for the peeling of fruit and vegetable articles.

Another object of the invention is to provide apparatus of the above character in which the positioning of the axis of rotation of the peeling knife or device is at right angles to the surface of the fruit and positioned substantially radially with respect to the center of the fruit.

Another object of the invention is to provide improved apparatus for the peeling of fruit articles in which a relatively compact peeling head is provided which can be traversed around the fruit to remove peel of a predetermined thickness.

Another object of the invention is to provide improved apparatus for peeling articles in which a rotary peeling knife is provided having an annular cutting edge presented to the fruit and rotated during the peeling operation.

Other objects and advantages of the invention will be apparent from the description of certain preferred embodiments thereof, as illustrated in the accompanying drawings, in which:

FIGURE 1 is a sectional view through the peeling head with the plane of the view coinciding with the longitudinal axis of the peeling device.

FIGURE 2 is a fragmentary sectional view taken in a plane indicated by the line 2—2 in FIGURE 1.

FIGURE 3 is a sectional view partly in elevation taken in a plane indicated by the line 3—3 in FIGURE 1.

FIGURE 4 is a sectional view taken as indicated by the line 4—4 in FIGURE 1.

FIGURE 5 is a fragmentary sectional view of a modified form of a peeling device.

FIGURE 6 is a sectional elevational view taken as indicated by the line 6—6 in FIGURE 5.

FIGURE 7 is an end view of another modified form of peeling knife.

FIGURE 8 is a sectional view through the peeling knife shown in FIGURE 7 taken in a plane indicated by the line 8—8.

FIGURE 9 is an end elevational view of still another modified form of peeling knife.

FIGURE 10 is a transverse sectional view through the peeling knife construction of the type shown in FIGURE 9.

FIGURE 11 illustrates in sectional elevation a further modified form of peeling knife.

The peeling head of the present invention comprises generally a body having a substantially annular support for engaging the article to be peeled and providing a journaled mounting for a rotary peeling knife with the annular peeling edge at its outer side, and adapted to be positioned with its axis substantially radially thereof.

The peeling head also includes auxiliary knife means for shredding or cutting into segments the strip of peel cut free from the article by the annular cutting edge, this second cutting action taking place while the peel is still attached to the article.

Referring to FIGURES 1 through 4, the peeling head comprises a two-part body 10 and 11 connected by suitable cap screws 12. The body structure also includes an annular member 13 secured about an extension 10a of the body part 10 and dowelled thereto. The member 13 has its upper edge 14 adapted to engage the article to be peeled and to position this article with respect to an annular peeling knife 16 secured at the upper end of a shaft 17 which is journaled in a bearing portion 18 of an annular knife member 31 and a bearing portion 19 of a gear 21. A washer 20 is interposed between the nut 16a of the knife 16 and the member 31. The shaft 17 has a keyed driving connection with a pinion 22 threaded thereon and has keyed thereto a locking nut 23 at its lower end for the pinion 22 which nut has a journaled mounting in the lower part 11 of the body. Driving engagement is effected between the bearing portions 18 and 19 by suitable dowel pins 24. The knife 31 carries opposite upstanding knife elements 32 having inwardly turned, radially disposed upper edges 33 sharpened along the radially extending portion and along the upright portion thereof.

The drive from the shaft 27 to the knife 16 and to the pair of knife members 31 effect rotation thereof in opposite directions so that counter-rotation of the knife member 31 is provided with respect to the knife 16. The gear 21 meshes with a second gear 26 carried by a drive shaft 27 and the pinion 22 meshes with an intermediate idler pinion 28 which in turn meshes with the pinion 29 carried by the shaft 27. Also, the upright portion 32 sweeps around the inner wall of the sleeve 13 for clean-out purposes, the pieces of peel being ejected through a clean-out opening 34 (FIGURE 2) of the support 13.

Referring to FIGURES 5 and 6, a modified construction is shown in which an annular knife 41 for removing a strip of peel from the article is provided with integrally formed cut-off knives 42 on the lower face thereof for severing the peel into small segments.

In operation, the article 46 having a peel 47 or a layer portion to be removed, is placed against the inclined upper edge 14 of the cylinder or sleeve 13 and the curvature of the article brings it into engagement with the rapidly rotating cutting edge of the annular knife 16. As the rotation of the annular knife 16 proceeds in one direction, the counter-rotation of the knives 33 in the opposite direction serve to cut or comminute the peel into strips 48 and the upright portion 32 rotating past the inner wall of the sleeve or support 13 sweep the cut segments 48 ahead of them and eject them through the opening 34. The modification shown in FIGURES 5 and 6 operates in the same manner except that the cut-off knives 42 are attached to and rotate with the annular peeling knife 41.

It will be noted that by adjusting the peeling knife 16 with reference to the article engaging and positioning edge 14 of the sleeve 13, the depth of peel, or thickness of layer to be removed, can be gauged or adjusted. This adjustment can be made by using washers 20 of different thicknesses in cooperation with the hub 16a of the knife 16.

In the form of the invention illustrated in FIGURES 7 and 8, the peeling knife is also of a construction to be placed with its axis of rotation perpendicular or substantially perpendicular to the surface of the article to be peeled, and is provided with an annular cutting edge and in this case the cutting edge 51 is formed as an internal annular cutting edge on a ring or annulus 52 having a pair of supporting arms 53 formed integrally with a rotary drive shaft 54, having its axis perpendicular to the plane containing the cutting edge 51. From the above description, it will be seen that the peeling knife of FIGS. 7 and 8 presents an end structure for annular contact with the fruit article being peeled, and that this end structure includes the annular cutting edge or knife means 51 and an annular surface or end surface means immediately adjacent thereto and encompassing the knife edge 51. The end surface means contacts the article being peeled so that such fruit or vegetable article will be deformed slightly and will therefore press against this small annular metallic surface outside the actual cutting edge. This annular end surface means serves to position the article with respect to the cutting edge and to limit the depth of cut. The support for the annular cutting means comprises the shaft 54, the diverging arms 53, and the annular ring 52 on the inner edge of which the cutting means 51 is formed. In this form of the invention the annular member 52 can be traversed in any direction with respect to a fruit to be peeled and while preferably rotated, can also perform a peeling action by simply being translated with respect to the fruit. The sharpened cut off edges 56 of the arms 53 are positioned closely adjacent the annular cutting edge 51 of the peeling knife and act to cut off segments of the strip of skin being removed from the article upon clockwise rotation.

In the form of the invention shown in FIGURES 9 and 10, a peeling structure is provided including an internal annular cutting edge 61 formed with the inner periphery of a ring 62 carried at the upper end of a sleeve 63 and projecting inwardly therefrom. The sleeve 63 is suitably secured to a supporting collar or sleeve 64, journaled in a mounting member 66. The sleeve 64 carries a gear 67 meshing with a suitable drive gear 68.

In this form of the invention the cut off knives 71 are formed at the upper end of an internal sleeve or collar 72 which is journaled within the collar 64 and extends therethrough carrying a gear 73 meshing with a drive gear 74. A suitable retainer ring 76 is provided at the lower end of the internal sleeve 72 to maintain the assembly in place. Preferably the internal cut-off or comminuting knives 71 project inwardly and terminate substantially in the same cylinder that contains the annular cutting edge of the knife 61, and are rotated oppositely to the peeling knife 61. The passage 77 formed by the inside of the sleeve 72 provides for discharge of the segments of peel 78.

In the form of the invention shown in FIGURE 11, a peeling knife 81 is provided of the type shown and described in connection with FIGURE 5, this knife 81 also having cut-off knives 82 formed integrally therewith. The knife 81 is positioned inside of an annular article positioning member 83. The upper annular edge 84 of the member 83 is generally parallel to the peeling knife 81 and provides a positioning element for the fruit or objects being peeled. The member 83 has a hub 89 in which the shaft 86 is slidably mounted and the member 83 is connected to the knife 81 for rotation therewith by an integral extension or pin 87 slidably engaging aperture 88 in the member 83. The member 83 has side openings 85 for ejection of cut segments of skin or flesh. The hub 89 of the member 83 is provided with external threads having threaded engagement with a cup-shaped nut member 91 whose lower end overlaps a shoulder 95 of shaft 86. The nut member serves to adjust the position of the positioning member with respect to the knife 81, this position being secured by a set screw 92. The lower end of the shaft 86 is provided with a threaded extension 93 engaging an internally threaded nut portion 94 formed at the upper end of a drive shaft 96. A set screw 97 secures the adjustment of the shaft 93 with respect to the shaft 96.

It will be seen that by adjusting the position of the housing with respect to the knife 91, the depth of cut can be controlled. Also it will be apparent that in the form of the invention shown in FIGURE 11, the knife can be traversed in any direction over the surface of the fruit or vegetable article so that a back-and-forth peeling or cutting traverse or other desired path can be obtained.

While I have shown and described certain preferred embodiments of the invention, it will be apparent that the invention is capable of variation and modification, and its scope should be limited only by the scope of the claims appended hereto.

I claim:

1. An annular peeling knife structure for a fruit or a vegetable article for removing a strip of peel from the surface of the fruit or vegetable article and having an internal opening whereby the peel will pass inside said internal opening in the knife structure, the annular knife structure being constructed to contact the surface of the fruit or vegetable article throughout its annular extent, said structure including a peeling knife comprising a support providing an axis of rotation for said peeling knife, said peeling knife including an annular cutting edge carried by said support located generally at right angles to said axis of rotation, and also forming a part of an end structure of said knife for contact with the surface of the article with said axis disposed at right angles to said surface, whereby the peel will be removed as a strip as the knife is passed over the surface of the article in contact therewith and extend through said opening; and said end structure also including annular end surface means located adjacent said cutting edge and disposed thereabout for engaging and positioning the article with respect to said cutting edge, and said end structure including article receiving means providing a central open recessed construction with respect to said cutting edge with said edge defining said central recess and providing for entry of a portion of an article engaged with said end surface means inside of said cutting edge to present the peel of the article for removal of a strip thereof by said cutting edge.

2. An annular peeling knife structure as recited in claim 1 and also including rotatable knife means carried by said support and positioned adjacent said peeling knife for severing said strip of peel into segments.

References Cited in the file of this patent

UNITED STATES PATENTS

| | | |
|---|---|---|
| 652,181 | Haff | June 19, 1900 |
| 2,250,651 | Pickens et al. | July 29, 1941 |
| 2,255,048 | Ewald | Sept. 9, 1941 |
| 2,359,584 | Roehner | Oct. 3, 1944 |
| 2,456,446 | Rieske | Dec. 14, 1948 |
| 2,477,037 | Baker | July 26, 1949 |
| 2,556,208 | Musso | June 12, 1951 |
| 2,598,711 | Musso | June 3, 1952 |
| 2,602,481 | Salido | July 8, 1952 |
| 2,620,002 | Lupton | Dec. 2, 1952 |
| 2,632,242 | Musso | Mar. 24, 1953 |
| 2,703,123 | Buck | Mar. 1, 1955 |